UNITED STATES PATENT OFFICE.

FLORENTINE J. MACHALSKE, OF CHICAGO, ILLINOIS, ASSIGNOR OF ONE-HALF TO ROBERT F. PIERCE, OF CHICAGO, ILLINOIS.

PROCESS OF PRODUCING MANGANATES, PERMANGANATES, HALOGENS, AND HYDROXIDS.

956,120.  Specification of Letters Patent.  Patented Apr. 26, 1910.

No Drawing.  Application filed October 19, 1908.  Serial No. 458,505.

*To all whom it may concern:*

Be it known that I, FLORENTINE J. MACHALSKE, a citizen of the United States, residing at Chicago, in the county of Cook and State of Illinois, have invented certain new and useful Improvements in Processes of Producing Manganates, Permanganates, Halogens, and Hydroxids, of which the following is a specification.

This process, generally stated, consists in producing manganates, especially alkali manganates, by heating a mixture of a compound of the desired base of the manganate, especially an alkali haloid, and a manganous compound, especially the dioxid, in the presence of an oxidizing agent such as air, to a temperature sufficient to effect the desired reaction. An electric furnace is desirable or necessary for the commercial operation of the process. Such furnace may be either of the arc or resistance type. An electric current, preferably alternating, of from 1670 amperes at 60 volts to 2500 amperes at 40 volts is sufficient for a furnace of the usual size. When an alkali or other haloid compound is employed, the halogen is liberated and may be variously utilized.

The process further contemplates treatment of the resulting alkali or other manganate with water, to produce a permanganate and hydroxid.

In employing the process to produce sodium manganate, a mixture of about two parts of sodium chlorid and one part of manganese dioxid is heated, preferably in an electric furnace, in the presence of atmospheric air, to a temperature sufficient to cause the materials to react with the production of one part of disodium manganate and two parts of free chlorin. The chlorin may be conducted away from the furnace and used for the manufacture of bleaching powder, liquefied, or otherwise utilized, as for converting the manganate into permanganate according to the equation:

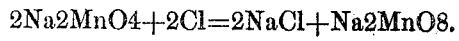

$$2Na_2MnO_4 + 2Cl = 2NaCl + Na_2Mn_2O_8.$$

The sodium manganate is then treated with water, three parts of the manganate and two parts of water giving one part of manganese dioxid, one part of sodium permanganate and four parts of sodium hydroxid. The manganese dioxid may be returned to the electric furnace as part of a new charge. The sodium permanganate may be converted into potassium permanganate by causing it to react with potassium chlorid.

It will be seen that my process affords a cheap and convenient method of converting sodium chlorid into sodium permanganate, sodium hydroxid and chlorin.

I claim:

1. The process of producing manganates, which consists of heating a mixture of a haloid of the desired base of the manganate and a manganous compound, in the presence of an oxidizing agent, to a temperature sufficient to cause the materials to react upon each other with the production of a manganate, as set forth.

2. The process of producing manganates and a halogen, which consists of heating a mixture of a chlorid of the desired base of the manganate and a manganous compound, in the presence of an oxidizing agent, to a temperature sufficient to cause the materials to react upon each other with the production of a manganate and a halogen, as set forth.

3. The process of producing alkali manganates, which consists of heating a mixture of an alkali chlorid and a manganous compound, in the presence of an oxidizing agent, to a temperature sufficient to cause the materials to react upon each other with the production of a manganate, as set forth.

4. The process of producing alkali manganates, which consists of heating a mixture of an alkali chlorid and manganese dioxid, in the presence of an oxidizing agent, to a temperature sufficient to cause the materials to react upon each other with the production of a manganate, as set forth.

5. The process of producing alkali manganates, which consists of heating a mixture of an alkali chlorid and manganese dioxid, in the presence of oxygen, to a temperature sufficient to cause the materials to react upon each other with the production of a manganate, as set forth.

6. The process of producing alkali manganates and a halogen, which consists of heating a mixture of an alkali haloid and a manganous compound, in the presence of an oxidizing agent, to a temperature sufficient to cause the materials to react upon each other with the production of an alkali manganate and a halogen, as set forth.

7. The process of producing alkali permanganates and hydroxids, which consists of heating a mixture of an alkali compound and a manganous chlorid, in the presence of an oxidizing agent, to a temperature sufficient to cause the materials to react upon each other with the production of a manganate, and treating the manganate with water, as set forth.

8. The process of producing potassium permanganate, which consists of heating a mixture of a sodium compound and a manganous compound, in the presence of an oxidizing agent, to a temperature sufficient to cause the materials to react upon each other with the production of sodium manganate, treating the sodium manganate with water and thereby producing sodium permanganate, and converting the sodium permanganate into potassium permanganate by treating it with a potassium salt, as set forth.

In testimony whereof, I affix my signature in presence of two witnesses.

FLORENTINE J. MACHALSKE.

Witnesses:
C. N. HARRINGON,
DONALD C. PRICE.